United States Patent Office 3,468,308
Patented Sept. 23, 1969

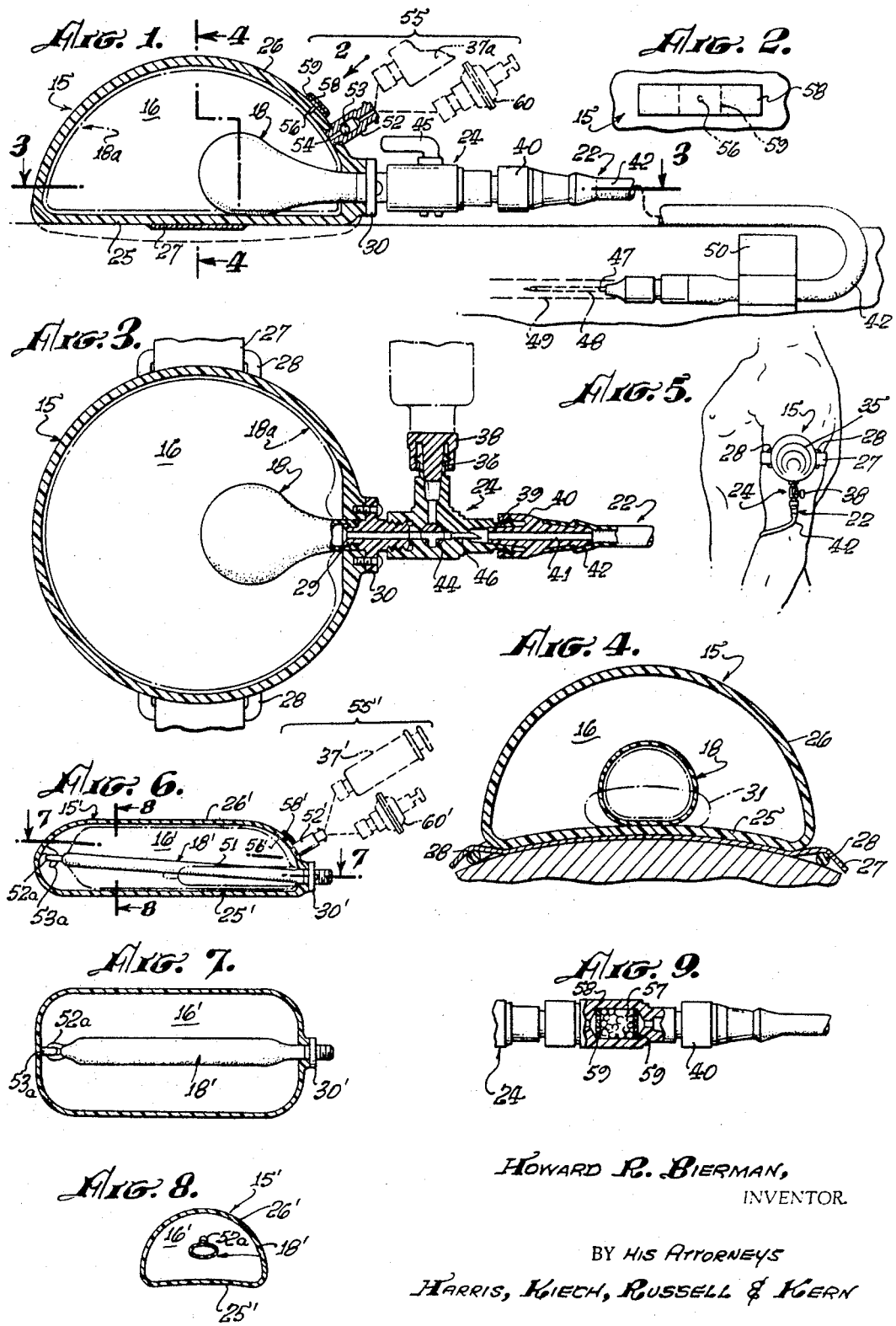

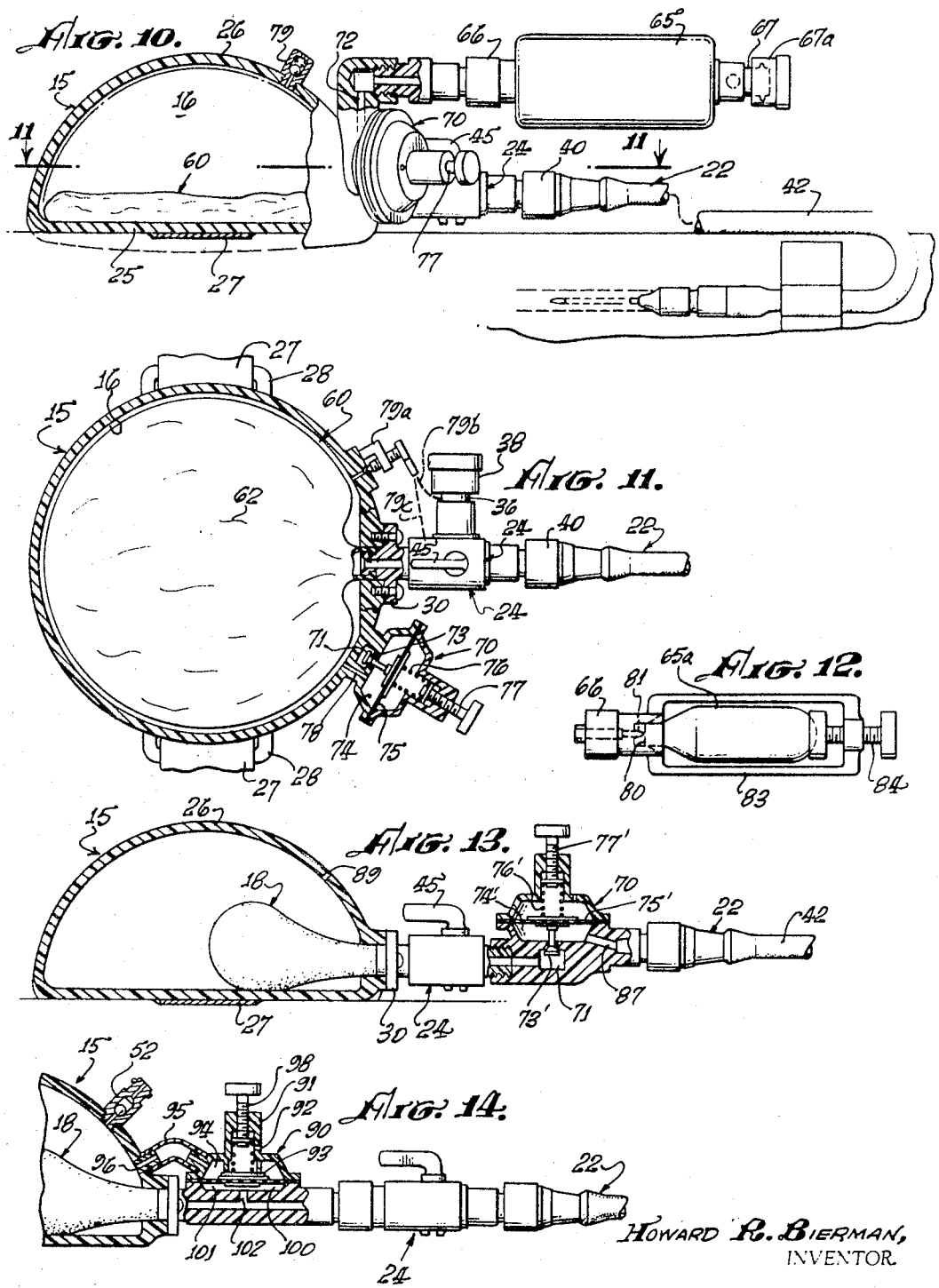

3,468,308
PRESSURE INFUSION DEVICE FOR AMBULATORY
PATIENTS WITH PRESSURE CONTROL MEANS
Howard R. Bierman, 152 N. Robertson Blvd.,
Beverly Hills, Calif. 90211
Filed Jan. 17, 1966, Ser. No. 521,208
Int. Cl. A61m 5/14, 1/00; B65d 35/54
U.S. Cl. 128—214                                    12 Claims

ABSTRACT OF THE DISCLOSURE

A device for expelling a liquid from a bladder member at an extremely slow rate over an extended period of time with the pressure on the liquid being accurately controlled and maintained substantially constant by a pressure regulator or other pressure-control means acting directly on the liquid being expelled or acting indirectly thereon by control of pressure applied to the exterior of the bladder member to control its rate of collapse. The device is particularly suited to the slow and prolonged infusion of medicaments into the body while the recipient is ambulatory.

---

My invention relates to a small device for expelling a stored liquid at an extremely slow but substantially constant rate with the expulsion continuing over a large number of hours.

More particularly, a primary embodiment of the invention comprises a device for the ambulatory infusion of a medicament into the body with the infusion continuing at an extremely low rate over a number of hours that will usually range from about eight hours up to about five days or more or that may sometimes range from a minimum of about four hours up to several days, all while the patient remains ambulatory if such condition is otherwise medically feasible.

There are many instances in which medicaments are desirably introduced to the body in minute quantities over a prolonged period of time. For example, my research has shown that arterial therapy of neoplasms by infusion of suitable medicaments is beneficial and that the slow generation time and prolonged life span of the cells in the leukemias and in neoplasms in general makes desirable continuous and prolonged infusion for optimum benefits. In this and many other instances it has been found that such prolonged and incremental medication gives results far superior to periodic injections that may be dangerous to normal cells or tissue because of the high concentration of the medicament at infusion times. At best, periodic injections provide intermittent action with periods of excess and deficient medication.

In the medical field, slow and prolonged infusion is desirable in many other instances. For example, minerals, proteins, vitamins, amino acids, heparin, etc. can be infused into humans or animals for purpose of nutrition, prevention of muscular dystrophy, increase (or decrease) of normal biological functions (e.g. fertility, weight or height control), etc. The slow infusion of medicaments is desirable in the treatment of human and veterinary diseases such as cancer, leukemia, lymphomas, infectious or contagious diseases (e.g. bacterial virus or fungal), metabolic disorders (e.g. diabetes), etc. A slow infusion of an anesthetic into the body over a number of hours is often advantageous as compared with a single injection or multiple periodic injections. In general, the invention finds wide use in investigation, diagnosis and treatment of disease both animal and human and in the biologic sciences (e.g. in biochemistry, physiology, pharmacology, etc.). It may also be used in preventive medicine for animal or human immunization, public health, and prophylactic programs.

Many of the terms herein are used in a broad sense. For example, when referring to infusion I have reference to parenteral, oral or absorptive transfer of liquids into the body. Arterial infusion will be exemplified but other types of infusion are contemplated either by direct injection to a selected area or through a scarified area of the skin covered by a small cup. In referring to the body I have reference to the torso or extremities of humans or animals. When referring to medicaments I have reference not only to drugs but also to more benign liquids such as saline solutions, solutions for intravenous feeding or solutions or liquid materials having biological or other effects.

Previous attempts toward prolonged infusion have usually involved gravity-flow methods and have usually required bed confinement of the patient and periodic checking or monitoring by the nurse or doctor to be sure that the gravity-induced flow is continuing at a proper rate. The problem is complicated by the fact that the pressure head changes with change in the amount of liquid in the elevated reservoir; also by the fact that any change in bed position of the patient that changes the elevation of the infusion point relative to the reservoir will change the infusion rate. There has been no satisfactory way of actually measuring the slow flow rates involved. In this latter connection measurement by a drop-counting technique is both tedious and unsatisfactory and exposes the medicament to contact with the air in which the drops form. Often the desired flow rate may be in the range of one drop in about 4–12 minutes up to 40 drops per minute, making determinations inaccurate and corrections thereof tedious and time-consuming. It is an object of the invention to provide a self-monitoring system for the slow expulsion of medicaments or other liquids—a system that can be pressured and set into operation with assurance that the flow will continue at the desired slow rate irrespective of movement that might otherwise change the discharge rate.

There is need for a small light-weight device that can be fixed to the body near an infusion position and that will silently and reliably deliver the medicament to the patient at an extremely slow rate over a large number of hours. Its pressure source should develop a substantially constant pressure throughout the infusion period and should be protected against generation of abnormal pressures through any act or movement of the patient. The device should be such that a precharged pressure device can be employed or such that the doctor can introduce into the device the desired quantity of medicament under pressure, expel all air from the system and rely on the device to deliver the charged medicament to the patient through an infusion means in a desired number of hours or days. The device should be such that it will continue reliable operation even though the patient is ambulatory—a device that can be secured to the body beneath the clothing without restriction of motion of the patient. Often it is desirable that the device be of a single-use disposable nature. It should of course be capable of sterilization. It is an object of the present invention to provide an ambulatory infusion device having some or all of the above characteristics.

For ambulatory parenteral infusion the pressure source should develop a pressure slightly higher than arterial pressure, the latter being usually in the neighborhood of 160 mm. of mercury. A pressure source containing about 5 to 1,000 ml. of medicament and producing a pressure in the range of about 160–200 mm. of mercury or even up to 300 mm. of mercury in some uses is desirable although sources of higher or lower cubical content producing pressures above 300 mm. of mercury can be employed for some purposes. It is an object of the invention to provide a compact light-weight pressure source of this nature and capacity connected to an infusion or delivery means with the flow rate being controlled at least in part by a pressure-control means. In medicinal uses this flow rate may be from about .1 ml./hr. up to 250 ml./hr. A widely usable infusion rate may be from a fraction of a milliliter per hour, e.g. about .5 ml./hr. or less, up to ten or twenty milliliters per hour. Exemplary of typical embodiments, the invention may include a small pressure source of about 10–50 ml. capacity connected to a flow-control means delivering this quantity of liquid uniformly over a 1 to 5 day period or the source may be as large as 1,000 ml. with a flow-control means designed to expel this amount of liquid in a period of four hours to three, four or five days.

In my prior application Ser. No. 495,074, filed Oct. 12, 1965, there is disclosed a device of this general nature employing a pressure-distendable bladder member formed of highly elastic material disposed in an outer shell in which the pressure remains at atmospheric pressure. Flow control was primarily by a porous mass in the discharge means ahead of the infusion position. The pressure on the liquid was determined largely or exclusively by the internal stresses of the distended bladder member and tended to decrease toward the end of the collapse period. This resulted in a small decrease in flow rate and made it difficult to expel all of the liquid from the bladder member. It is an object of the present invention to provide some auxiliary force or control acting with the internal stresses of such a bladder member and that aids in determining its rate of collapse and consequently the rate of liquid expulsion therefrom.

The present invention contemplates the use of a deformable member or bladder member that is made of elastic material or nonelastic material, being in either case movable from a collapsed position to an expanded position during charging of the unit and later from expanded to such collapsed position during prolonged expulsion of the liquid. It is an object of the invention to provide a pressure-control means for controlling the deformable member to move at the desired extremely slow rate toward the collapsed position to prolong the expulsion of the liquid for a period of at least several hours.

In accordance with the present invention the pressure-control means can act either directly or indirectly on the liquid expelled from the deformable member. In some embodiments it is an object to control the pressure on the side of the deformable member opposite to the liquid. This could be accomplished by controlling the admission of fluid into the corresponding space of the outer shell to control either the subatmospheric or superatmospheric pressure therein. In other embodiments the pressure-control means acts directly on the liquid and indirectly on the deformable member, preferably in a manner to keep the pressure of the expelled liquid constant over the desired number of hours during which expulsion or infusion is to continue. In many instances the pressure-control means includes a pressure regulator that may be a simple constant-pressure valve or a more complex pressure or flow regulator including some type of regulated valve. It is an object of the invention to provide accurately-regulated flows by use of pressure-control means of any such type.

When liquids are infused into a blood vessel it is important to maintain the flow essentially constant irrespective of heart-induced pressure undulations. Stated in other words, it is desirable to avoid a pulsed flow of the liquid in step with the pressure pulses or undulations of the blood stream. A pressure curve of arterial pressure will show peaks of systolic pressure normally about 160 mm. of mercury and troughs or diastolic pressure of about 80 mm. of mercury the difference between these pressures being known as the pulse pressure. The peak or systolic pressure increases with body activity, causing a greater spread between systolic and diastolic pressures and thus increasing the pulse pressure. In all instances it is desirable that the pressure within the pressure source be significantly higher than the systolic pressure and that this pressure be controlled by the pressure-control means to insure that the liquid at or just before entry into the blood vessel is at a pressure only slightly higher than the systolic pressure of the blood. At the same time it is desirable that the blood pressure undulations should not be transmitted upstream to the pressure-control means. It is an object of the invention to damp out such blood pressure undulations so that they are not transmitted back to the pressure-control means or to the deformable member. This can be accomplished by use of a suitable restriction in the discharge means that conducts the liquid from the vicinity of the pressure-control means to the extreme end of the discharge end portion. Alternatively the restriction can be at any position in the pressure-transfer path between the discharge means and the pressure-control means or the deformable member.

Further objects and advantages of the invention will be evident to those skilled in the art from the following description of exemplary embodiments.

Referring to the drawings:

FIG. 1 is a view, partially in section of one embodiment of the invention, FIG. 2 being a fragmentary view taken in the direction of the arrow 2 of FIG. 1;

FIGS. 3 and 4 are sectional views along corresponding lines of FIG. 1;

FIG. 5 is a utility view illustrating the invention attached to the arm of a patient;

FIG. 6 is a sectional view of an alternative embodiment of the invention while FIGS. 7 and 8 are sectional views taken along corresponding lines of FIG. 6;

FIG. 9 illustrates a restrictive-type flow-control means that can be employed with any embodiments of the invention;

FIG. 10 is a view, partially in section, of an alternative embodiment, while FIG. 11 is a sectional view taken along the corresponding line of FIG. 10;

FIG. 12 illustrates an alternative source of pressure, useful with the embodiment of FIGS. 10 and 11;

FIG. 13 is a sectional view of another embodiment of the invention; and

FIG. 14 is a fragmentary view illustrating still a further embodiment.

The device of FIGS. 1–5 includes generally an outer shell 15 providing an internal or confined space 16; a deformable member 18 therein, shown as a bladder member and serving to divide the interior of the outer shell 15 into a first chamber that may be within the bladder member and a second chamber that may be the space with the outer shell around and exterior of the bladder member; and a discharge means 22 that may include a multi-way valve 24. The outer shell 15, the deformable member 18 and the multi-way valve 24 are fully described in my application supra and reference thereto is made for details beyond the brief description herein.

The outer shell 15 in FIGS. 1–4 is exemplified as of substantially semispherical shape, made of rigid material, preferably a transparent plastic. It provides a downwardly-concave lower wall 25, shaped to conform to a curve of the body, and a crested upper wall 26 that may be integral with or attached to the lower wall 25 in fluid-tight relation. Means is provided for attaching the outer shell 15 to a portion of the body near the desired infusion position. This means is exemplified as a strap 27 passing beneath the lower wall 25 and through attachment loops 28 of the outer shell 15, the strap encircling the body member or being attached thereto by strips of adhesive tape.

The deformable member 18 in this embodiment is made of a highly elastic material, such as rubber or elastic plastic, that will return to substantially its initial form when the deformable member is distended and subsequently contracted. As shown, the deformable member 18 is a balloon-like bladder member with its initial length half or less the internal length of the internal space 16 and its initial height, as viewed in FIG. 1, half or less the height of this space, being distendable both lengthwise and laterally when internally pressured. It may provide a neck surrounding a hollow neck 29 of an attachment member 30 that closes an opening of the outer shell, the deformable member being moved through this opening in folded condition and then allowed to assume its normal shape in the internal space 16.

When within the internal space 16 the deformable member 18 of this embodiment should preferably have a definite initial shape, the full-time shape of this member being typical and illustrates the member 18 in its contracted position. For most exacting results it can be designed to be of a shape and wall thickness to expand into an expanded shape, suggested by dotted lines 18a of FIG. 1, that generally corresponds to and substantially fills the internal space 16, all before any significant portion thereof comes into pressural contact with the inner wall of the outer shell 15. FIGS. 1 and 3 show a less exacting form of the invention in which the deformable member 18 provides a lower portion that is initially in light engagement with the lower wall 25. Any slippage therebetween during distension or contraction of the deformable member will not significantly change the desired operation. In some instances the deformable member may be initially of a flattened configuration, as suggested by the dotted lines 31 of FIG. 4, to distend more uniformly into the shape of the outer shell 15. The deformable member 18 may if desired be a plastic-lined rubber member as described in my application supra. Index means, such as the index rings or markings 32 of FIG. 5, can be imprinted on or molded in the crested upper wall 26 of the outer shell. These can be calibrated infractions or in volume units. When viewed with the deformable member 18 as a background such calibrations will show the degree to which the deformable member has been filled, thus giving an indication of the time remaining during which discharge or infusion will continue as the deformable member progressively contracts.

The multi-way valve 24 serves in the exemplified embodiment to control the admission and discharge of a liquid to and from the deformable member 18. It may comprise a valve body 35 connected permanently or detachably to the attachment member 30. It is shown as having a side fitting 36 adapted to receive the end fitting of a syringe 37, shown in dotted lines, upon removal of a cap or closure 38. The valve body 35 is shown as including also an end fitting 39 removably receiving a fitting 40 at the entrance end of the discharge means 22. As shown, this latter fitting includes a passage 41 through a tubular neck over which can be slipped the end of a rubber or plastic tube 42 forming a part of the discharge means 22.

A rotary valve member 44 is operated by a handle 45 and acts when in the position shown in FIG. 3 to conduct pressured liquid from the deformable member 18 to the discharge means. This flow may be through a restriction provided by a passaged needle 46 mounted in the valve body 35. When the rotary valve member 44 is turned clockwise 90° from the position shown in FIG. 3 the interior of the deformable member 18 is in communication with a side passage provided by the side fitting 36 and the deformable member can be charged and pressured by the syringe 37. The valve member 44 can then be turned to some position blocking all exit, whereupon the syringe 37 may be detached. The fitting 40 of the discharge means 22 is shaped for attachment to the side fitting 36 should it be desired to expel liquid from the deformable member under manual control of the valve 24 for emergency infusion at a temporarily increased rate or for other expulsion of some of the liquid for other reasons.

The discharge means provides an infusion end portion adapted for insertion into the body at an infusion position 47 (FIG. 1). The infusion end portion may constitute a hypodermic needle 48 inserted into a blood vessel 49 of the body or into body tissue. In other instances the infusion end portion may constitute a cup-like member covering a scarified area of the skin for absorptive transfer of the liquid into the body. In still other instances the infusion end portion may be the end of the tube 42 or a catheter connected thereto with either such end portion following an arterial path to a remote position in the body to discharge liquid medicament in the locale of the infection. In other instances the discharge means can be inserted through body openings, e.g. openings of the nose into the stomach, or directly into the gastro-intestinal tract. The tube 42 near its infusion end portion may be taped to the skin by a strip of adhesive tape 50 (FIG. 1).

If such a highly elastic deformable member collapses, without external pressure control, from its expanded position (shown by dotted lines 18a) to its collapsed position (its full line position in FIG. 1), the discharge pressure it induces on the liquid is exclusively the result of internal stresses in the deformable member. During such collapse this discharge pressure remains substantially constant throughout a useful collapse range, ending when the bladder member is in an intermediate position. A large part of the liquid is expelled during this time. Thereafter the pressure drops rather rapidly as the deformable member returns to its full-line collapsed position. By way of example, if the initial or maximum pressure within the filled deformable member is 200 mm. of mercury, this pressure will drop to about 180 mm. in about ¾ or ⅚ of the total collapse movement, representing a substantial useful collapse range for many infusion purposes. However in accordance with the present invention the rate of collapse can be controlled or determined by a pressure-control means that acts directly on the liquid (e.g. FIG. 13) or that acts indirectly thereon by controlling the pressure applied to the exterior of the deformable member 18 (see other embodiments of the invention herein disclosed).

Exemplifying this action in the embodiment already disclosed, the outer shell 15 may be equipped with a fitting 52 incorporating in a chamber thereof a ball-type check valve 53 controlling the flow through a passage 54 opening on the internal space 16. During filling of the deformable member 18 by forward advancement of the plunger of a filled syringe 37, air within the internal space 16 will be displaced outwardly past the valve 53. Subsequent progressive collapse of the deformable member will create a vacuum in the space 16 around the deformable member 18. A minute vent opening 56 through the outer shell 15 can be used as a simple gas-admission means for controlling the absolute pressure within the outer shell acting exteriorly on the deformable member 18, the discharge pressure on the liquid being then the result of stresses in the material of the deformable member and the absolute pressure outside the latter. If the vent opening 56 is made sufficiently small it will not fully relieve the vacuum created by the progressive collapse of the deformable member and a subatmospheric pressure will exist in the space 16 outside this member to restrict the rate of its collapse and consequently the rate at which liquid exudes from the discharge means 22 for infusion or other purposes. Air reaching the vent opening 56 can be filtered or further restricted by applying an adhesive bandage 58 (FIGS. 1 and 2) over the vent opening with a porous pad 59 of the bandage covering the opening so that inflowing air must move sideways through the pad before reaching the vent opening.

A more accurate control of the collapse rate and a more prolonged useful collapse range can be obtained by initially creating a vacuum within the outer shell 15 around the deformable member 18. For example after the forward movement of the plunger of the syringe 37 has filled the deformable member 18 the multiway valve 24 may be closed and the end fitting of the syringe attached to the fitting 52 as suggested at 37a. Upon retraction of the plunger of the syringe the internal space 16 around the deformable member will be evacuated so that even the initial collapse movement of the deformable member will be controlled by the subatmospheric pressure external thereof. Restricted entry of air into the outer shell to control the rate of collapse of the deformable member 18 may be through the vent opening 56. Alternatively the vent opening 56 can be closed or eliminated and the check valve 53 designed to act as a restricted gas-admission means controlling the rate of collapse of the deformable member, this restricted gas-admission means permitting controlled ingress of air into the outer shell through this valve at a rate insufficient to relieve the subatmospheric pressure. A check valve designed to permit a small leak, as through a small by-pass passage or through a porous ball, can be used. A further alternative is to connect a pressure regulator 60 to the fitting 52 to act as a gas-admission means and control the inflow of air. This pressure regulator may be of any known type and may be designed to displace the ball of the check valve 53 or supplement its action in controlling a small inflow of air.

Desirably the subatmospheric pressure exterior of the deformable member 18 is controlled to compensate for any reduction in discharge pressure on the liquid resulting from decreased internal stresses within the deformable member as it collapses. If this is done the useful collapse range of the deformable member can be greatly increased and the discharge pressure on the liquid maintained more nearly constant throughout the discharge or infusion period.

The embodiment of the invention disclosed in FIGS. 6–8 is generally similar to that previously described with exceptions noted below. Corresponding parts are designated by primed numerals. In this embodiment both the crested upper wall 26' and the body-shaped lower wall 25' are elongated to provide an elongated internal space 16'. The deformable member 18' is here a closed-ended tube of highly elastic material of an initial shape suggested by the dotted lines 51. After insertion, this tube is preferably tensioned longitudinally to engage an end ring 52a with a hook 53a of the outer shell 15'. The longitudinal tension of the tube exists during the filling and liquid-pressuring collapse of the tube with advantages as described in my application supra. This embodiment may be provided with the minute vent 56' closed if desired by the adhesive member 58'. It may also have the fitting 52' to which may be connected a syringe 37' and/or a pressure regulator 60' functioning in the manner previously described. The multi-way valve 24 and the discharge means 22 previously described can be employed with this embodiment.

In either embodiment the minute vent opening 56 or 56', the fitting 52 or 52' and/or the pressure regulator 60 or 60' constitute a pressure-control means 55, 55' acting in part to control the rate of collapse of the deformable member. The pressure-control means assists in causing the deformable member to contract at an extremely slow rate to prolong the expulsion of the liquid for a period of at least several hours.

A flow-control means can be employed to supplement this action, typically a flow-control means providing a restriction through which the liquid must flow before being released from the end of the discharge means 22. The passaged needle 46 and/or the hypodermic needle 48, if used, may provide this type of restriction. FIG. 9 shows another type of restriction that can be used with the embodiments already described or to be described. Here the impedance to liquid flow is induced by a porous mass 57 of any suitable material through which a liquid, free of solids, can ooze at the relatively low pressure imposed on the liquid by the invention. The porous mass 57 may be disposed at any position along the path of liquid flow. As shown it is disposed in a fitting 58 that may be interposed between the multi-way value 24 and the fitting 40 of the discharge means 22. Many advantages result from the use of a mass of material that is initially or adjustably compressed to produce the desired pore size and flow rate, the compression being maintained during use of the invention. A compressed mass of filamentary material with the filaments matted or interwoven to be in fabric form can be utilized, e.g. a fabric comprising interwoven filaments of Dacron, nylon, or other plastic that is non-wettable and nonabsorbable as concerns the liquid passing therethrough, preferably of a type capable of withstanding autoclaving temperatures for sterilization and of course nonreactive with any medicament being infused. A single fabric element can be wrinkled or folded into a chamber of the fitting 58, being compressed therein between perforated discs 59. As pointed out in my application supra the pores in such a mass can be adjusted in size by changing the degree of compression, often desirably accomplished by providing a means by which the attending physician can adjust the degree of compression at the time the device is placed in operation.

In the embodiment of FIGS. 10 and 11 the deformable member, here designated by the numeral 60, is exemplified as a bladder member that is completely collapsible and that is made of a material that is substantially non-stretchable. A suitable plastic is preferred, preferably one that is nonreactive with any liquid or medicament to be exuded from the discharge means 22, e.g. polypropylene, polyethylene, Teflon, Kel-F, etc. The lower wall of such a deformable member or bladder member may be sized to cover the lower wall 25 of the outer shell 15. The upper wall of such a deformable member or bladder member may be of a shape corresponding to the inner surface of the top wall 26 and will collapse in flutes, wrinkles, or folds as suggested at 62. The upper and lower walls of such a deformable member will collapse into contact with each other if the internal space 16 is pressurized, thus insuring that all of the liquid will be discharged from the deformable member during its movement to collapsed position.

In this embodiment of the invention the outer shell 15 is pressurized from a pressure source 65 constituting a pressure vessel having an outlet fitting 66. The vessel may be pressured in any suitable way, such as through a syringe connected to a fitting 67 after a cap 67a thereon is removed. The pressure in the source 65 should be substantially higher than that desired in the outer shell 15. A pressure regulator 70 of any suitable design is connected to the fitting 66 and reduces the pressure to the desired constant value, which value will be held constant by the regulator throughout the infusion period. For normal infusion purposes this pressure will be maintained at or about systolic pressure, typically about 160 mm. of mercury or slightly higher if a flow-control means of the restrictive type is employed. In this embodiment the pressure regulator 70 acts as a constant pressure valve slowly admitting gas under pressure to the outer shell 15 to induce and control the rate of collapse of the deformable member 60.

The regulator 70 is diagrammatically shown as including a high pressure chamber 71 to which the high pressure gas is delivered from a passage 72 of the regulator. A valve 73 controls the admission of the gas to a chamber 74 bounded by a diaphragm 75 to which an adjustable pressure is applied by a spring 76 backed up by the usual adjusting screw 77. The chamber on the opposite side of the diaphragm 75 may be maintained at atmospheric value by use of a vent, as shown. The controlled pressure in the chamber 74 is transmitted through a port 78 to the interior of the outer shell 15. With this arrangement the constant pressure in the chamber 74 will be applied to the exterior of the deformable member 60 to control its collapse and the rate at which liquid therein will exude from the end of the discharge means 22. The latter rate will remain constant throughout the time that the deformable member 60 is being slowly collapsed.

With such a system the unit may be sold with the deformable member 60 filled with the desired liquid or medicament. However the system is made more diversified in use or by employing the multi-way valve 24 permitting filling through the side fitting 36 from a syringe when the cap or closure 38 is removed and the valve properly actuated.

A spring-loaded check valve 79 (FIG. 10) may be used to discharge the air displaced by the deformable member 60 as it is being filled by the syringe. The spring tension will normally be sufficient to hold the check valve 79 closed when the interior of the outer shell 15 is pressured by the gas from the regulator 70 but any small leakage through the check valve will not upset the desired constant flow as the regulator will admit more gas to compensate for such leakage. An alternative way of discharging the displaced air is shown in FIG. 11 as constituting a valve 79a that can be opened during filling of the deformable member 60 and closed thereafter. Such a valve can be actuated by manually turning a handle thereof or this handle can be made to open the valve 79a automatically when the syringe is connected to the fitting 36, as through an operative connection suggested by the dotted line 76b, or when the multi-way valve 24 is in its charging position, as through an operative connection suggested by the dotted line 76c. If desired the valve 79a may be a part of the multi-way valve 24 and control the flow of displaced air from the outer shell through a valve passage that is open only when the multi-way valve is in its charging position, the displaced air exiting to the atmosphere or into the discharge means 22.

FIG. 12 illustrates an alternative pressure source 65a comprising a pressured cartridge having a penetrable end 80 that can be pierced by a point 81 of the fitting 66 when the cartridge is moved leftward in its frame 83 by pressure exerted on the cartridge by a screw 84. The cartridge is of well known design and may be precharged with air, $CO_2$ or other gas that will be released to the pressure regulator 70 when the end of the cartridge is pierced. The amount of gas compressed in the pressure source 65 or 65a will be sufficient to collapse the deformable member 60 and displace all of the liquid therefrom at the slow rate provided by the setting of the pressure regulator 70.

In the embodiment of FIG. 13 the pressure regulator, similarly constructed with its elements designated by primed numerals, is disposed directly in the path of liquid flow from the deformable member 18 that is constructed of elastic material as in the embodiments of FIGS. 1 and 6. The liquid from the interior thereof is expelled into the high pressure chamber 71' and reduced in pressure by the valve 73' to maintain a constant pressure in the chamber 74'. The constant-pressure liquid is delivered through a port 87 to the entrance end of the discharge means 22. As before, the pressure regulator 70 includes a diaphragm 75' to which an adjustable pressure is supplied through a spring 76' having the usual adjustment screw 77'. The interior of the outer shell 15 is conveniently maintained at atmospheric pressure by provision of a vent hole 89. It will be clear however that any change in atmospheric pressure, as for example if the patient should change elevation during traveling, will not significantly change the infusion pressure. The pressure regulator 70 acts as a constant-pressure valve to keep this pressure constant. The embodiment of FIG. 13 represents a very simple and dependable structure for prolonging the collapse of the deformable member 18 to extend over a number of hours while at the same time maintaining the pressure at the inlet end of the discharge means 22 constant so that the liquid will exude at a constant rate throughout the movement of the deformable member 18 to its collapsed position.

In the embodiment of FIG. 14 a pressure regulator 90 substitutes for the pressure regulator 60 in the embodiment of FIG. 1 and responds to pressure of the discharged liquid to keep the pressure thereof constant. It does so by controlling accurately the admission of air into the internal space 16 around the deformable member 18, thus controlling the degree of vacuum acting on the latter to retard its collapse. The pressure regulator 90 has a tubular housing 91 into which air is admitted through the port 92. A valve disc 93 extends across a valve face formed at the lower open end of the tubular housing 91 and controls the admission of air into a chamber 94 from whence this air is conducted through a connection 95 and a port 96 to the interior of the outer shell 15. A light spring 97, adjustable by a screw 98 exerts a slight downward pressure on the valve disc 93 urging it against a member supported by a diaphragm 100 separating the chamber 94 from a chamber 101. The latter is in pressural communication with liquid discharging from the deformable member 18. This pressural communication may be direct or indirect. As shown the pressural communication is established through a side passage 102 which, with the chamber 101, can be filled with the liquid being discharged. Pressure changes on the latter are transmitted to the chamber 101 and are opposed by the spring pressure. The result net pressure on the diaphragm 100 will control the degree of restriction on atmospheric air seeping into the chamber 94 and into the interior of the outer shell 15. The restriction may be between the valve disc 93 and the valve face at the lower end of the tubular housing 91. Alternatively or in addition, the valve disc 93 may be made of compressible porous material in which event the restriction and the amount of air leaking therethrough will depend upon the degree to which the porous material is compressed in the annulus below the valve face of the tubular housing 91. As pressure inside the deformable member 18 decreases slightly upon progressive collapse thereof and due to the relaxing tension therein, the pressure in the chamber 101 will correspondingly decrease and the amount of air entering the outer shell 15 will slightly increase. This will tend to relieve more rapidly the vacuum in the outer shell initially created by use of the aforesaid fitting 52. The net resut will be to extend the useful collapse range of the deformable member and maintain the discharge pressure substantially constant over a longer period of time than if the pressure regulator 90 was not used.

As previously mentioned, it is desirable that heart-induced pressure undulations should be damped out and not permitted to be transmitted rearwardly into the unit to affect the operation of the pressure control means whether or not this includes a pressure regulator. Any restriction created by the hypodermic needle 48, the porous mass 57 or the passaged needle 46 will tend to damp out blood-induced pressure undulations and prevent their transfer to a pressure regulator 70 or 90 close to the discharge means or to the more remote pressure regulators or pressure-control means of the embodiments of FIGS. 1, 6 and 10. In any event such undulations will be damped out before they are transmitted rearwardly to the deformable member in the outer shell 15 and there will be no corresponding pulsing of the pressure on the discharged liquid that might result in a pulsed flow into the blood vessel.

All embodiments of the invention are well adapted to ambulatory infusion of medicament without interfering with the normal movement of the patient. It should be understood however that the invention has other uses where it is desired to exude or expel minute amounts of a liquid from within or adjacent a deformable member to a position removed therefrom with the flow continuing at a uniform rate for a period of hours or days.

Various changes and modifications can be made without departing from the spirit of the invention as defined in the appended claims.

I claim:

1. A small device for receiving and expelling a small volume of liquid at a controlled extremely slow rate over a large number of hours, said device including in combination:

an outer shell providing an internal space therewithin;
a deformable member in said internal space dividing same into first and second chambers separated by said deformable member, said deformable member being movable from a collapsed position to an expanded position upon charging of said liquid into said first chamber and movable from said expanded position to said collapsed position during expulsion of such liquid from said first chamber;
discharge means having an inlet end portion adapted to receive such expelled liquid, and a discharge end portion adapted to exude such liquid at said controlled and extremely slow rate; and
pressure-control means for controlling the deformable member to move at an extremely slow rate toward said collapsed position to prolong the expulsion of said liquid from said discharge end portion for a period of at least several hours, said pressure-control means including means for continuously admitting a gas into said second chamber at a slow and controlled rate, said gas-admitting means including a pressure regulator having a valved passage in the path of gas flow to said second chamber for controlling such gas flow to said second chamber and the pressure therein.

2. A device as defined in claim 1 including means for controlling said pressure regulator in response to changes in pressure of said expelled liquid in said inlet portion of said discharge means to maintain the pressure of such expelled liquid constant.

3. A small device for receiving and expelling a small volume of liquid at a controlled extremely slow rate over a large number of hours, said device including in combination:

an outer shell providing an internal space therewithin;
a hollow deformable member comprising a collapsible bladder member formed of flexible and substantially non-stretchable material and having a single narrow neck for ingress and egress of said liquid, said deformable member being mounted by its narrow neck in said internal space and dividing the same into first and second chambers separated by and respectively within and without said deformable member, the interior of said bladder member constituting said first chamber, said deformable member being movable in said internal space from a collapsed position to an expanded position upon charging of said liquid into said first chamber through said neck, said deformable member being movable from its expanded position to its collapsed position in response to differences in fluid pressure in said first and second chambers, such collapse expelling liquid from said first chamber through said neck;
discharge means having an inlet end portion adapted to receive such expelled liquid, and a discharge end portion adapted to exude such liquid at said controlled and extremely slow rate; and
means for controlling the relative pressures in said first and second chambers (1) for maintaining constant the rate of expulsion of said liquid from said first chamber during collapse of said deformable member, (2) for prolonging the expulsion of said liquid from said discharge end portion to continue at such constant rate for a period of time of at least several hours and (3) for maintaining substantially constant the pressure on the expelled liquid, said last-named means including a fluid-pressure-responsive pressure-control means for controlling the rate of collapse of said deformable member to effect said expulsion at said constant rate for said period of time, said pressure-control means comprising a pressure source and a pressure regulator acting as a constant-pressure valve reducing the pressure of said source to a substantially constant pressure and a connection between said pressure regulator and said second chamber to maintain the pressure in the latter substantially constant, the pressure in said second chamber as controlled by said pressure regulator constituting substantially the exclusive pressure applied to said liquid to effect expulsion thereof from said bladder member.

4. A small device for receiving and expelling a small volume of liquid at a controlled extremely slow rate over a large number of hours, said device including in combination:

an outer shell having an inner wall and an arched outer wall providing an internal space therewithin;
a hollow deformable member comprising a collapsible bladder member formed of flexible and substantially nonstretchable material and having a single narrow neck for ingress and egress of said liquid, said deformable member being mounted by its narrow neck in said internal space and dividing the same into first and second chambers separated by and respectively within and without said deformable member, the interior of said bladder member constituting said first chamber, said deformable member being movable in said internal space from a collapsed position to an expanded position upon charging of said liquid into said first chamber through said neck, said deformable member being movable from its expanded position to its collapsed position in response to differences in fluid pressure in said first and second chambers, such collapse expelling liquid from said first chamber through said neck, said bladder member comprising one wall conforming in shape to said inner wall and another wall substantially conforming in shape to said arched outer wall when said bladder member is filled with said liquid, said other wall wrinkling during movement toward said inner wall during collapse of said bladder induced by the pressure in said second chamber;
discharge means having an inlet end portion adapted to receive such expelled liquid, and a discharge end portion adapted to exude such liquid at said controlled and extremely slow rate; and
means for controlling the relative pressures in said first and second chambers (1) for maintaining constant the rate of expulsion of said liquid from said first chamber during collapse of said deformable member, (2) for prolonging the expulsion of said liquid from said discharge end portion to continue at such constant rate for a period of time of at least several hours and (3) for maintaining substantially constant the pressure on the expelled liquid, said last-named means including a fluid-pressure-responsive pressure-control means for controlling the rate of collapse of said deformable member to effect said expulsion at said constant rate for said period of time, said pressure-control means comprising a pressure source and a pressure regulator acting as a constant-pressure valve reducing the pressure of said source to a substantially constant pressure and a connection between said pressure regulator and said second chamber to maintain the pressure in the latter substantially constant, the pressure in said second chamber as controlled by said pressure regulator constituting substantially the exclusive pressure applied to said liquid to effect expulsion thereof from said bladder member.

5. An ambulatory infusion device for the infusion of a liquid into the body with such infusion continuing at a slow constant rate over a large number of hours, said infusion device including in combination:

an outer shell;
means for attaching said outer shell to a portion of the body near an infusion position in which infusion of the liquid into the body is to take place;
a deformable member in said outer shell dividing the interior thereof into first and second chambers separated by said deformable member, said deformable member being movable from a collapsed position to an expanded position upon charging of said liquid into said first chamber and movable from said expanded position to said collapsed position during expulsion of such liquid from said first chamber, said deformable member being a collapsible bladder member made of a material that is substantially nonstretchable, the interior of said bladder member constituting said first chamber, the bladder member being collapsible by fluid pressure in said second chamber applied to the exterior of said bladder member;

a tubular discharge means having an inlet end portion connected to receive the liquid expelled from said first chamber and a discharge end portion adapted to exude the expelled liquid from the end thereof into the body; and pressure-control means for controlling said deformable member to move at an extremely slow rate toward said collapsed position to prolong the expulsion of said liquid from said discharge end portion for a period of at least several hours, said pressure-control means comprising a pressure source of said fluid, a pressure regulator reducing the pressure of said source to a substantially constant pressure, and a connection between said pressure regulator and said second chamber to maintain the fluid pressure in the latter substantially constant, the fluid pressure in said second chamber as controlled by said pressure regulator constituting substantially the exclusive pressure applied to said liquid to effect expulsion thereof from said bladder member.

6. An ambulatory infusion device as defined in claim 5 in which said outer shell comprises a skin-engaging lower wall and a crested upper wall, said bladder member having lower and upper walls substantially conforming in shape to said lower wall and said crested upper wall of said outer shell when said bladder member is filled, the upper wall of said bladder member wrinkling during collapse of said bladder member and being movable into contact with said lower wall of said bladder member when said bladder member is collapsed.

7. An ambulatory infusion device for the infusion of a liquid into the body with such infusion continuing at a slow constant rate over a large number of hours, said infusion device including in combination:

an outer shell;

means for attaching said outer shell to a portion of the body near an infusion position in which infusion of the liquid into the body is to take place;

a collapsible bladder member in said outer shell, said bladder member being made of a material that is substantially nonstretchable, said bladder member dividing the interior of said outer shell into first and second chambers separated by said bladder member with the interior of said bladder member constituting said first chamber, said bladder member being movable from a collapsed position to an expanded position upon charging of said liquid into said first chamber and being movable from said expanded position to said collapsed position during expulsion of such liquid from said first chamber;

a tubular discharge means having an inlet end portion connected to receive the liquid expelled from said first chamber and a discharge end portion adapted to exude the expelled liquid from the end thereof into the body;

a pressure-control means for controlling said bladder member to move at an extremely slow rate toward said collapsed position to prolong the expulsion of said liquid from said discharge end portion for a period of at least several hours, said pressure-control means comprising a pressure source, a pressure regulator reducing the pressure of said source to a substantially constant pressure, and a connection between said pressure regulator and said second chamber to maintain the pressure in the latter substantially constant, the pressure in said second chamber as controlled by said pressure regulator constituting substantially the exclusive pressure applied to said liquid to effect expulsion thereof from said bladder member; and a multi-way valve between said bladder member and said tubular discharge means, said valve providing means for connecting thereto a source of said liquid, said valve being movable between a filling position connecting said source of said liquid to the interior of said bladder member and a discharge position connecting the interior of said bladder member to said tubular discharge means.

8. An ambulatory infusion device as defined in claim 7 including means for expelling air from said second chamber when said valve is in said filling position and said bladder member is being filled with said liquid.

9. An ambulatory infusion device for the infusion of a liquid into the body with such infusion continuing at a slow constant rate over a large number of hours, said infusion device including in combination:

an outer shell;

means for attaching said outer shell to a portion of the body near an infusion position in which infusion of the liquid into the body is to take place;

a deformable member in said outer shell dividing the interior thereof into first and second chambers separated by said deformable member, said deformable member being movable from a collapsed position to an expanded position upon charging of said liquid into said first chamber and from said expanded position to said collapsed position during expulsion of such liquid from said first chamber, said deformable member being a distendable bladder member made of highly elastic material providing said first chamber therein and distendable upon insertion of a liquid therein to pressure such liquid by stresses in the highly elastic material, said second chamber being within said outer shell around said bladder member and containing a compressible fluid acting on the exterior of the distended bladder member, said pressure-control means including means for controlling the fluid pressure in said second chamber, the pressure in said second chamber as controlled by said means controlling the rate of collapse of said bladder member moving from its expanded position ot its collapsed position.

10. An ambulatory infusion device as defined in claim 9 in which said pressure-control means comprises a pressure-responsive pressure regulator connected to said second chamber to regulate the pressure in the latter.

11. An ambulatory infusion device as defined in claim 10 including means for changing the setting of said pressure regulator in response to changes in pressure in said inlet end portion of said tubular discharge means to maintain the latter pressure substantially constant.

12. An ambulatory infusion device for the infusion of a liquid into a blood vessel of the body with such infusion continuing at a slow constant rate over a large number of hours, said infusion device including in combination:

an outer shell providing an internal space therewithin;

means for attaching said outer shell to a portion of the body near an infusion position in which infusion of the liquid into the blood vessel is to take place;

a deformable member in said internal space dividing same into first and second chambers separated by said deformable member, said deformable member being movable from a collapsed position to an expanded position upon charging of said liquid into said first chamber and from said expanded position to said collapsed position during expulsion of such liquid from said first chamber, the pressure on the liquid in said first chamber progressively decreasing during movement of said deformable member from said expanded position to said collapsed position;

a constant-pressure valve receiving the expelled liquid and reducing the existing pressure thereof to a lower constant pressure in a discharge portion of said valve; and a tubular discharge means having an inlet end portion connected to receive the liquid from said discharge portion of said valve and a discharge end portion adapted to extend through the skin into said blood vessel, there being a restriction between the end of said tubular discharge means and said constant-pressure valve, said restriction being sufficiently small to damp out heart-induced pressure undulations in said blood vessel and prevent the transfer thereof through said tubular discharge means to said discharge portion of said valve.

References Cited

UNITED STATES PATENTS

| 2,816,690 | 12/1957 | Lari | 222—92 |
|---|---|---|---|
| 3,244,326 | 4/1966 | Bull | 222—386.5 |
| 2,261,213 | 11/1941 | Bierman | 128—214 |
| 2,597,715 | 5/1952 | Erikson | 128—272 |
| 2,761,445 | 9/1956 | Cherkin | 128—214 |
| 2,842,123 | 7/1958 | Rundhaug | 128—214 |
| 2,847,007 | 8/1958 | Fox | 128—214.2 |
| 2,876,768 | 3/1959 | Schultz | 128—214 |
| 3,048,171 | 8/1962 | Grau | 128—214.2 |

FOREIGN PATENTS 4,266   1887   Great Britain.

DALTON L. TRULUCK, Primary Examiner

U.S. Cl. X.R.

128—216, 232; 222—96, 212